United States Patent [19]

Sattler et al.

[11] Patent Number: 5,536,533
[45] Date of Patent: Jul. 16, 1996

[54] PROCESS FOR PRODUCING FIBROUS COMPOSITES, PARTICULARLY DOUBLE FLOOR PLATES, AS WELL AS PLATES PRODUCED BY THIS PROCESS

[75] Inventors: Heinz Sattler; Volker Thole, both of Braunschweig; Sebald Pallhorn, Goldbach; Bernhard Schmelmer, Kleinwallstadt, all of Germany

[73] Assignees: Fraunhofer-Gesellschaft zur Forderung der angewandten Forschung e.V., Munich; Goldbach GmbH, Goldbach, both of Germany

[21] Appl. No.: 33,396

[22] Filed: Mar. 19, 1993

[30] Foreign Application Priority Data

Mar. 19, 1992 [DE] Germany ............................ 42 08 826.7
Nov. 19, 1992 [DE] Germany ............................ 42 39 033.8

[51] Int. Cl.⁶ ....................................................... B05D 3/02
[52] U.S. Cl. ................. 427/372.2; 427/213; 427/213.32; 427/213.33; 427/314; 427/316; 427/322; 427/324; 427/325; 427/396.1; 427/379; 264/87; 106/703; 106/723; 106/731

[58] Field of Search .................... 106/703, 723, 106/731; 264/87; 427/213, 213.32, 213.33, 314, 316, 322, 324, 325, 372.2, 376.1, 379

[56] References Cited

U.S. PATENT DOCUMENTS 4,088,504  5/1978  Collepardi ............................... 106/90

*Primary Examiner*—Patrick J. Ryan
*Assistant Examiner*—Rich Weisbeiger

[57] ABSTRACT

A process for producing fibrous composite materials from feed stock formed preliminarily from a gypsum binder and chopped cellulose fibers, and saturating the mixture with water to the extent of at least 1.2 times its normal hydrated state, and beating the material to provide a fleece that is then spread on a flat surface and subjected to pressure for a sufficient length of time to drive out a substantial portion of the moisture from the product. The compression step is carried out long enough to achieve a bulk density of approximately 9/10 the dry bulk density of the components prior to hydration.

10 Claims, No Drawings

PROCESS FOR PRODUCING FIBROUS COMPOSITES, PARTICULARLY DOUBLE FLOOR PLATES, AS WELL AS PLATES PRODUCED BY THIS PROCESS

The invention relates to a process for producing fibrous composites, particularly double floor plates, tiles, slabs or boards, according to the preamble of the main claim. The invention also relates to the plates, slabs, tiles or boards produced by the process according to the invention.

Fibrous composites with inorganic binders are largely produced in a so-called wet process. The wet process is performed in such a way that by means of a partial dewatering from water-rich suspensions and using a screen cylinder or a direct material flow onto a rotating screen or felt belt, a very thin, continuous fleece is produced, which is wound onto a format roller so as to form a multilayer, thicker plate fleece. After reaching a fleece thickness corresponding to the desired plate thickness the fleece is unwound from the format roller starting from a parting line. The wet process has the advantage of a functional material distribution and fibre orientation, but suffers from several disadvantages. These include the degree of complication of the process, dewatering and waste water problems, necessary multilayer nature of the plates, need for transforming the fleece from the cylindrical winding into the plate shape and finally the defining of the plate thickness.

There are also semidry processes, in part also known as dry processes used for the production of composites. These processes aim at avoiding the disadvantages of the wet process. KLOS (Asbestzement, Technologie und Projektierung, Springer-Verlag 1967) inter alia describes a process in which the asbestos-fibre-cement mixture is sprayed with water during spreading on a dry or a water-moistened substrate. Another proposal for performing the process is based on the wetting out of the slightly moistened mixture, in that the latter is passed through a screen drum or a riddle. A further process is described according to which alternate dry and liquid mixture layers are placed on a belt and then compressed. The above literature source also describes the passing of a dry or semidry material fleece between two conveyor belts and the moistening of said fleece by a rotating, liquid-supplied screen cylinder.

Numerous proposals also exist in connection with the production of fibrous gypsum or fibrous cement plates.

DE-OS 30 15 734 describes a process for producing fibre-reinforced plates, in which an aqueous slurry of cement and fibres is fed onto a filter cloth, the excess water is then drawn off and several moist layers are combined into a multilayer product. In order that the plates have the desired characteristics, it is necessary to add to the aqueous slurry a fine material, whose particle size is smaller than that of the cement particles.

DE-S 28 54 508 discloses a process for the production of an asbestos-free building board, which comprises cellulose fibres and/or waste paper, hydraulic binders and optionally organic or inorganic additional fibres and/or aggregates, the cellulose fibres and/or the waste paper being brought to a grinding fineness of 30° to 70° SR.

Swiss patent 505 674 describes a process for the continuous production of shaped articles from gypsum and voluminous matting fibres by the application of the dry material to a continuously moving shaping surface and moistening the material with such a water quantity which is slightly above the quantity necessary for setting, the dosing and distribution of the dry materials from storage bins onto a preshaping belt upstream of the shaping belt take place in such a way that a two-layer, loose strand is obtained, which is formed by a fibre bed and a gypsum bed above it or below it and the two layers of the strand are mixed together vertically, before the supply of the setting water during or after the transfer of the strand from the preshaping belt to the shaping belt, followed by subsequent compression.

DE-OS 34 04 658 relates to a process for the continuous production of plates made from gypsum and fibrous material, moistening taking place in a first mixing process. In this process water addition is regulated in such a way that the dosing of the dry mixture is carried out volumetrically or on a weight basis prior to the second mixing process.

DE-OS 27 51 466 discloses a process for the production of plates formed from fibrous materials and gypsum, according to which the material to be pressed is spread on a moving screen belt, wetted in finely distributed form and dewatered, the water being applied to the spread material to be compressed during the screen belt movement and subsequently a suction action is exerted and the material dewatered.

Patent application P 32 47 009.6 relates to a process for the production of plates from setting water-containing particles and pulverulent gypsum, which form a fleece on a moving substrate and this is compressed to form a plate strand, initially the setting water being added to the particles and then the latter are brought together with the gypsum immediately prior to mixing. The homogeneous mixing of the gypsum and particles takes place during the falling path onto the substrate.

In summarizing, it can be established that the known wet and semidry processes do not fulfil the requirements of an optimum and functional material distribution and particularly fibre orientation. Therefore the strength values of the plates produced are correspondingly low and for a comparable material composition only have bending strengths of max. 50% (6 to 8 $N/mm^2$) of the possible maximum. This means that only a small proportion of the fibres present in the plate can be used for increasing the bending strength or reinforcing action. With a view to obtaining higher strength values, conventionally the fibre-binder ratio is increased for the same water-binder ratio, so that although the spreadability of the material mixture is improved, the greater restoring forces and lower transverse tension strengths of the plates caused by the higher fibre proportion prevent a bending strength increase whilst at the same time impairing the fire resisting behaviour. Under these conditions it is only possible to produce plates, whose density is below the optimum and correspondingly the strengths are below the maximum. The use thereof for highly stressed materials, e.g. double floor plates, is consequently either impossible or only possible to a very limited extent.

The use-relevant disadvantages of fibrous composites produced according to the known semidry and wet processes are the result of procedures which although improving certain characteristics are unusable in view of the total number of characteristics required for double floor plates for the purpose of taking account of the contrary influence of the water-binder ratio (process water) on the spreadability (material distribution), hydration and material characteristics in the compression state defined according to claim 1.

Moreover, due to the still high free moisture content of these plates (15 to 27% by weight) it is not possible to obviate the need for a technical drying.

The problem of the invention is therefore to provide a process for producing composite materials based on fibres and binders hardening by hydration, in which the process water requirement and the residual water content in the finished product are considerably reduced. The process must also be suitable, whilst avoiding the multilayer nature, for producing plates with a bending strength which is well above that achievable with the prior art.

This problem is solved by the characterizing features of claim 1.

Claims 2 to 10 give advantageous further developments with respect to the process. The plates produced by the process according to the invention are characterized by the features of claim 11 and claims 12 and 13 disclose advantageous further developments. The use of the composite materials is characterized by the features of claim 14.

It has surprisingly been found that by a planned control of the water-binder ratio w in conjunction with the hydrate-water-binder ratio $w_o$, as well as in combination with the process steps and a planned compression of the plates composite materials can be produced with a bending strength above 15 N/mm².

The invention covers all standard binders and fibres known from the prior art for the production of fibrous composites. Preferably the process is performed with β-hemihydrate gypsum as the binder, as well as with cellulose-containing fibres.

According to the invention in the process the procedure is such that the water-binder ratio w compared with the hydrate-water-binder ratio in the case of complete hydration $w_o$ is reduced to $w \leq 1.5\ w_o$. Preferably a ratio of $w \leq 1.2\ w_o$ is respected. The definition $w \leq 1.5\ w_o$ does not exclude values with $w \leq w_o$, because also when using a non-stoichiometric water ratio adequate finished product strengths can still be obtained. However, tests have shown that it is particularly favourable if w is approximately 1.2 $w_o$. The invention incorporates all values of $w \leq 1.5\ w_o$.

It is essential to the invention that in a first process stage (claim 1, feature a) all the feedstock is mixed, whilst respecting the necessary water-binder ratio. It has surprisingly been found that it is adequate if the mixing of the feedstock only takes place over a short time, i.e. a few seconds to max. 1 minute. Advantageously the mixing process is carried out for max. 5 s. The respecting of this condition has proved particularly favourable for the further process sequence.

According to another advantageous development of the process (claim 4), the process stage is subdivided into two partial stages. It is advantageous if firstly the binder is mixed with the fibres and then the water is added. Further thorough mixing takes place after water addition. An optimum distribution of the feedstock results from this measure. This has a particularly advantageous effect during hydration and therefore on the strength which can be obtained.

The advantageous measure according to claim 8, the addition of additives, leads to an optimum thorough wetting and to a distribution of the mixing water.

The fresh mass produced in this way is now homogeneously spread to form a fleece, whose height is dependent on the desired thickness $d_{des}$ of the plate to be produced, whilst taking account of the sought bulk density Q, which must be at least 0.9 $Q_o$. The plate fleece height must be about 5 to 10 times the desired plate thickness.

A further development of the invention (claim 8) proposes that fleece formation (shaping) takes place by means of separating or grinding units. This measure is advantageous in that it prevents or cancels out the formation of agglomerates. To this end the fresh material, directly prior to fleece formation, e.g. passes through a beater mill, so that homogenization is obtained.

It is also essential to the invention that the spread fleece is compressed to min. 0.9 $Q_o$ and this is e.g. achieved by means of a press. The invention obviously includes any apparatus which is suitable for exerting a corresponding pressure on the fleece. The exerting of this surface pressure ensures an optimum distribution of the mixing water in the fleece and as a result an almost complete hydration is obtained.

The plate formed in this way then remains up to the end of hydration in a compressed state (feature 1d) for which is indicative the maintaining of the constant plate thickness ($d_{des}$) and a pressure drop dependent on the binder hydration time to a residual pressure close to zero. The plate produced in this way only contains max. 5% free water immediately after removal from the press and only requires a very short or no drying period up to the obtaining of the state of equilibrium.

The invention also incorporates the production of composites having a density lower than 0.9 $Q_o$ (claim 4). For this purpose, according to the invention at the earliest 5 s following compression to a density $\geq 0.9\ Q_o$, the material fleece is relieved to min. 0.5 $Q_o$. This is brought about in that the press is opened for the corresponding time. In this case there is a resilience of the fibrous material. This simple measures ensures that, by means of the process according to the invention, it is also possible to produce composite materials with a lower density.

It has been found that the plates produced by the aforementioned process have excellent characteristics with respect to the rated load, bending strength and modulus of elasticity. The plates produced according to the invention have a rated load of more than 3000 N in the case of 2 mm sag, which corresponds to a bending strength of more than 15 N/ram² and a modulus of elasticity of more than 10 KN/m² . Thus, plates are made available for the first time which can be exposed to extremely high loads. The plates according to the invention are therefore particularly suitable for double floor plates for highest loads. As required, the plate thicknesses can range between 20 and 50 mm.

The invention is explained in greater detail by means of the following six examples.

EXAMPLE 1

Waste paper of group II/E12 is chopped by means of a drum chopping machine into paper chippings of approximately 20×20 mm², followed by working to fibres by means of a mill ($R_F$=1.5 g/cm³). A commercially available stucco (with approximately 85% β-hemihydrate, $R_B$=2.63 g/cm³) is intimately mixed with 15% by weight ($X_F$=0.15) of said fibres. Mixing water w=1.5 $w_o$=0.25 and which contains setting control additives is admixed with this dry material in finely divided form. Immediately following water addition the fresh material is again ground and loosened for fleece formation and spread onto a substrate. After the spreading process the fleece height for the plate thickness of $d_{des}$=36 mm and a dry bulk density of 1690 kg/m³ is approximately 250 mm. The fleece is compressed by a press to a height of $d_{des}$. The plate formed in this way remains in the compression state defined in claim 1 up to the end of hydration. Immediately after removal from the press the plate still contains about 5% free water and only requires very brief drying up to the state of equilibrium 20° C./65% relative humidity (corresponds to about 2.5% moisture).

Testing in accordance with RAL standard (RAL-GZ 941) gives a rated load of more than 5000N for a sag of 2 mm. The corresponding bending strength exceeds 28 N/mm².

EXAMPLE 2

According to example 1 by corresponding relief a plate with a dry bulk density of 1550 kg/m³ is produced. Testing according to RAL gives a rated load of more than 4000N for 2 mm sag and the corresponding bending strength is above 22 N/mm².

EXAMPLE 3

Following a premixing process paper chippings with a proportion of 15% by weight, based on the binder, are ground with the latter in a mill. The binder is 70% stucco, 25% granulated blast furnace slag (binder-fine) and 5% Portland cement. Water addition and compression take place according to example 1. At the end of the hydration of the stucco the plate produced is largely dimensionally stable and manipulatable, but requires a ripening storage of approximately 28 days for hydrating the hydraulic component. After brief drying and with a bulk density of 1550 kg/m³ rated loads of more than 4500N for 2 mm sag are obtained and the bending strength exceeds 25 N/mm².

EXAMPLE 4

Example 1 is modified in such a way that the fibrous material has a proportion of 10% by weight and the bulk density is 1600 kg/m³. The rated load is more than 3500N for 2 mm sag and the bending strength exceeds 20N/mm².

EXAMPLE 5

The plate is produced according to example 1, but with a reduced water-binder ratio of w=1.2 w$_o$=0.20. The density of the finished plate (in the state defined in claim 1) is 1800 kg/m³. Immediately following removal from the press, the plate still contains about 2.3% free water, which corresponds to the practical equilibrium state 20° C./65% relative humidity. There is no need to dry the plate.

Testing in accordance with the RAL standard (RAL-GZ 941) gives a rated load of more than 6000N for 2 mm sag and a breaking load of more than 1300N. The corresponding bending strength is above 30N/mm².

EXAMPLE 6

The plate is produced according to example 5, but its density after corresponding stress relief according to claim 4 was only 1500 kg/m³. The rated load was more than 4000N for 2 mm sag and the bending strength more than 23N/mm².

As used in the appended claims $Q_o$ is bulk density in grams per cubic centimeter $W_o$ is the hydrate water binder ratio, and is a dimensionless number, and for conventional builders gypsums is generally constant and approximately 0.17. $X_F$ is also a dimensionless number indicating the ratio of fibre to binder. The value of this ratio is generally 0.15.

The term $R_B$ represents the density in grams per cubic centimeter of the binder, $R_F$ the density in grams per cubic centimeter of the fibre.

W represents the water-binder ratio for a conventional wet process, gypsum is a dimensionless number generally on the order of several times the hydrate water-binder ratio with complete hydration $W_o$.

The foregoing parameters are related in accordance with the following relationship:

$$Q_0 = \frac{1 + W_0 + X_F}{\frac{1}{R_B} + \frac{X_F}{R_F} + W}$$

We claim:

1. A method for producing fibrous composite structural sheets from feed-stock that is made up from a gypsum binder material and cellulose fibers said method comprising:

mixing the feed-stock in water with a ratio of water to binder (W) $\leq 1.5$ times the hydrate water binder ratio ($W_o$), spreading the resulting mixture in the form of a fleece, compressing the fleece to provide a bulk density (Q) of at least 0.9 $Q_o$ (where $Q_o$ equals the dry bulk density dictated by the following relationship:

$$Q_o = \frac{1 + W_o + X_F}{\frac{1}{R_B} + \frac{XF}{R_F} + W}$$

maintaining said compressing step until a hardening phase sets in due to driving out of the water from the compressed fleece.

2. The method according to claim 1, wherein the mixing step is carried out for a maximum of 5 seconds.

3. The method according to claim 2, characterized by the preliminary step of mixing the binder with the fiber and such mixing being accomplished prior to the addition of water.

4. The method according to claim 3, further characterized the additional step of relieving the compression of the fleece to a minimum of 0.5 $Q_o$ bulk density no earlier than 5 seconds after application of the compression required to achieve the minimum bulk density of 0.9 $Q_o$.

5. The method according to claim 4, wherein water is added only to the extent of W being $\leq 1.2$ $W_o$.

6. The method according to claim 5, wherein the binder provided is β-hemihydrate gypsum.

7. The method according to claim 6, wherein the fibers comprise chopped cellulose fibers.

8. The method according to claim 7, wherein wetting agents are added to the material during the mixing step.

9. The method according to claim 8, wherein the material mixture is subjected to a grinding step prior to said spreading step.

10. The method according to claim 8, wherein the mixture is subjected to a beater mill prior to said spreading step.

* * * * *